US 8,006,815 B2

(12) United States Patent
Sommerfeld et al.

(10) Patent No.: US 8,006,815 B2
(45) Date of Patent: Aug. 30, 2011

(54) PARKING BRAKE ASSEMBLY FOR RAILWAY VEHICLE BRAKE SYSTEM

(75) Inventors: Howard Sommerfeld, Oak Forest, IL (US); Jonathon Marlow, Hobart, IN (US); Michael J. Moriarity, Lansing, MI (US); Wajih Kanjo, Lockport, IL (US); David Meyer, River Forest, IL (US); Bradley Anderson, Des Plaines, IL (US); Michael Ring, Saint John, IN (US)

(73) Assignee: WABTEC Holding Corp, Wilmerding, PA (US)

( * ) Notice: Subject to any disclaimer, the term of this patent is extended or adjusted under 35 U.S.C. 154(b) by 770 days.

(21) Appl. No.: 12/011,865

(22) Filed: Jan. 30, 2008

(65) Prior Publication Data
US 2008/0179144 A1    Jul. 31, 2008

Related U.S. Application Data

(60) Provisional application No. 60/898,564, filed on Jan. 31, 2007.

(51) Int. Cl.
*F16D 65/24* (2006.01)
(52) U.S. Cl. ........................... 188/170; 188/72.7
(58) Field of Classification Search .............. 188/166, 188/170, 167, 216, 203, 202, 200, 196 D, 188/196 P, 71.9, 72.7
See application file for complete search history.

(56) References Cited

U.S. PATENT DOCUMENTS

| RE36,036 E | 1/1999 | Engle |
| 6,491,352 B2 | 12/2002 | Engle |
| 6,684,989 B2 * | 2/2004 | Berra et al. ................... 188/170 |
| 6,761,253 B1 | 7/2004 | Kanjo et al. |
| 6,854,570 B2 | 2/2005 | Connell |
| 7,140,477 B2 | 11/2006 | Engle et al. |

FOREIGN PATENT DOCUMENTS

| AU | 2004201824 | 4/2004 |
| EP | 1127766 | 2/2001 |
| EP | 1241069 | 3/2002 |
| RU | 2129502 | 4/1999 |
| SU | 1819788 | 6/1993 |

* cited by examiner

*Primary Examiner* — Melanie Torres Williams
(74) *Attorney, Agent, or Firm* — James Ray & Assoc

(57) ABSTRACT

A parking brake assembly for a railway car includes a ratchet mounted for rotation on a threaded piston rod of a brake actuator and a holding pawl engageable with the ratchet for maintaining a push rod of the parking brake assembly to apply braking force when the air pressure is lost in the brake pipe and releasing the push rod to accordingly release the braking force when the supply of air pressure in the brake pipe is restored. An operating lever and a cylinder connected thereto are provided for selectively rotating the holding pawl. Valve is provided for supplying air pressure to and evacuating it from the cylinder. Release mechanism is provided for manually releasing the braking force. The parking brake assembly is employed with either truck-mounted or carbody-mounted braking system.

18 Claims, 11 Drawing Sheets

US 8,006,815 B2

PARKING BRAKE ASSEMBLY FOR RAILWAY VEHICLE BRAKE SYSTEM

CROSS-REFERENCE TO RELATED APPLICATIONS

This application is related to and claims priority from Provisional Patent Application Ser. No. 60/898,564 filed on Jan. 31, 2007.

FIELD OF THE INVENTION

The present invention relates, in general, to railway vehicle braking systems and, more particularly, this invention relates to a parking brake assembly for use in a railway vehicle braking system and, still more particularly, the present invention relates to a parking brake assembly for use in a railway vehicle truck mounted brake rigging and, yet more specifically, the present invention relates to a release mechanism for use with a railway vehicle parking brake assembly.

BACKGROUND OF THE INVENTION

As is generally well known in the railway industry, the brake system used on the railway cars employs a plurality of force transmitting members to convert the pneumatic fluid pressure from the brake pipe into a mechanical force to apply and bias one or more brake shoes against the tread of one or more wheels of the railway car.

When a single railway car or a plurality of railway cars are parked at a siding, or yard, the hand brake or parking brake on at least some of these railways cars is applied as a precaution against unwanted or unexpected movement of the cars. A typical railway car hand brake system normally consists of an apparatus for manually applying and biasing one or more brake shoes against the tread of one or more wheels of the railway car by either turning a hand wheel or pumping a ratchet handle on a hand brake mechanism attached to the railway car. However, it has been known for an operator to improperly apply the hand brake causing undesirable movement of the railway cars.

Furthermore, during an emergency brake application or during loss of the fluid pressure in the brake pipe due to rapture or disconnect, it is necessary to apply and maintain brakes until the supply of the fluid pressure can be restored.

Prior to the conception and design of the present invention, numerous attempts have been made to alleviate the operational problems related to parking individual railway cars. U.S. Pat. No. 7,140,477 issued to Engle et al., U.S. Pat. No. 6,854,570 issued to Connell, U.S. Pat. No. 6,761,253 issued to Kanjo et al., and U.S. Pat. No. 6,491,352 issued to Engle describe various constructions of the parking brake assemblies. However, there is a continuing need for a parking brake assembly for use in a railway vehicle braking system which applies brakes due to supply of air pressure or through a hand brake mechanism and which maintains brakes in the applied condition when the supply of air pressure is discontinued.

SUMMARY OF THE INVENTION

According to one embodiment, the present invention provides a parking brake actuator for a railway vehicle brake rigging being in fluid communication with a fluid pressure carrying brake pipe of the railway vehicle. The brake rigging has at least a push rod mounted for movement therewithin. The push rod is responsive to a reduction of the fluid pressure in the brake pipe to move in a first direction causing the brake rigging to apply brakes and is responsive to an increase of the fluid pressure in the brake pipe to move in an opposed second direction causing the brake rigging to release brakes. The parking brake actuator includes a hollow housing engageable with a predetermined portion of the brake rigging. The housing has a first end and an opposed second end. The first end has means for mounting the parking brake actuator to a portion of the brake rigging. The second end has an opening axially formed therethrough. A piston assembly is mounted for a longitudinal movement within the housing and divides the housing into a pressurized portion disposed intermediate the first end of the housing and a first end of the piston assembly and a non-pressurized portion disposed adjacent the second end of the housing. A piston rod is secured at a first end thereof to a second end of the piston assembly and is capable of extending through the axial opening in the second end of the housing responsive to the supply of fluid pressure. The piston rod is securable at a second end thereof to a first end of the push rod, whereby the piston rod and the piston assembly move longitudinally with the push rod in the first and second directions. A means is provided for preventing rotation of the piston rod during its longitudinal movement within the housing. A spring member is disposed in the non-pressurized portion of the housing and is caged between an inner surface of the second end of the housing and the second end of the piston assembly. The spring member is capable of exerting a force against the piston assembly upon release of the spring member responsive to a loss of the fluid pressure in the pressurized portion of the housing, causing the longitudinal movement of the piston assembly within the housing in the second direction to accordingly retract the piston rod thereinto. A fluid communication means is provided in a fluid communication with the pressurized portion of the housing and with the brake pipe for supplying the fluid pressure to the parking brake actuator during brake application of the railway vehicle brake rigging resulting in the longitudinal movement of the piston assembly and the piston rod in the first direction and in compression of the spring member. The fluid communication means is also provided for evacuating the fluid pressure from the pressurized portion of the housing during brake release resulting in the longitudinal movement of the piston assembly and the piston rod in the second direction due to the force exerted by the released spring member. There is a first elongated thread which is formed on at least a portion of the piston rod movable through the non-pressurized portion of the housing. A ratchet is mounted within the non-pressurized portion of the housing for rotation about a longitudinal axis of the piston rod. An aperture is axially formed through the ratchet. A second thread is formed on a surface of the axial aperture for operable engagement with the first thread. A shaft is mounted for rotation in a spaced relationship with the ratchet. Rotational axis of the shaft is substantially parallel to a rotational axis of the ratchet. The shaft has a first end thereof disposed within the non-pressurized portion of the housing and has a second end thereof extending through an aperture formed through the second end of the housing past an outer surface thereof. A holding pawl is disposed within the non-pressurized portion of the housing and is secured to the shaft for rotation therewith. The holding pawl is rotateable in a first rotational direction for engagement with the ratchet teeth when a first rotational force is applied to the second end of the shaft due to the fluid pressure in the brake pipe being reduced to a predetermined level, the engagement preventing movement of the push rod in the second direction. The holding pawl is rotateable in a second rotational direction for disengaging the ratchet teeth and permitting the push rod to move in the second direction when a second rotational force is applied to at least one of the second end of the shaft and the holding pawl due to the increase of the fluid pressure in the brake pipe.

According to another embodiment of the invention, there is provided a manual release assembly for a parking brake assembly in a railway car. The parking brake assembly at least includes a push rod mounted for reciprocal motion within the brake rigging and a pneumatic fluid-pressure-operable brake actuator connected to the push rod and responsive to a reduction of pneumatic fluid pressure in a brake pipe to longitudinally move the push rod in a first direction in order to apply a braking force and maintain the push rod to continue to apply the braking force, the parking brake assembly responsive to an increase of the pneumatic fluid pressure supply in the brake pipe to longitudinally move the push rod in a second direction to release the braking force. The manual release includes a bracket secured to a rigid member of the railway car. An L-shaped slot is formed in the bracket. An elongated link member has a first end thereof passed through the L-shaped slot and extending outwardly from the bracket. There is means for connecting a second end of the link member to the brake actuator. A grip member is disposed on and secured to the first end of the elongated link member. The grip member is manually operable to move the link member from a first position enabling application of the parking brake assembly into a second position enabling release of an applied parking brake assembly. A bias means is provided and is engageable with the elongated link member and with the bracket for returning it into the first position upon release of the grip member.

According to yet another embodiment, the invention provides, in combination with a parking brake assembly, a valve means mounted within a fluid communication means connecting the parking brake assembly to a brake pipe. The valve means is operable in a first position for supplying the fluid pressure to the parking brake assembly when the fluid pressure in the brake pipe is maintained above a predetermined level. The valve means is also operable in a second position to discontinue supply of the fluid pressure to the parking brake assembly when the fluid pressure in the brake pipe falls below the predetermined level.

OBJECTS OF THE INVENTION

It is, therefore, one of the primary objects of the present invention to provide a parking brake assembly for a railway vehicle braking system that is capable of maintaining brakes in the applied position upon loss of the air pressure in the brake pipe.

Another object of the present invention is to provide a parking brake assembly that is particularly applicable to a truck mounted brake rigging.

Still another object of the present invention is to provide a parking brake assembly that may be used in combination with currently used manually activated hand wheel hand brakes.

Yet another object of the present invention to provide a parking brake assembly for a railway vehicle braking system that, if necessary, may be manually released due to a resupply of the air pressure.

It is a further object of the present invention to provide a parking brake assembly for a railway vehicle braking system which by virtue of being automatically activated upon the loss of air pressure will eliminate the possibility of operator error in applying the parking brake.

It is another object of the present invention to provide a parking brake assembly that can be easily retrofitted into currently used braking systems.

Another object of the present invention is to provide a parking brake assembly that employs a ratchet and holding pawl mechanism operably mounted within the brake actuator of such railway vehicle braking system.

Still another object of the present invention is to provide a manual release mechanism for manually releasing applied parking brake assembly.

Another object of the present invention is to provide a manual release mechanism for manually releasing spring-applied parking brake assembly that can be safely and conveniently operated without reaching into confines of the brake systems.

A further object of the present invention is to provide a manual release mechanism for manually releasing a spring-applied parking brake assembly that can temporarily latch the parking brake assembly in the released position.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE VARIOUS EMBODIMENTS OF THE INVENTION

Figure 1:
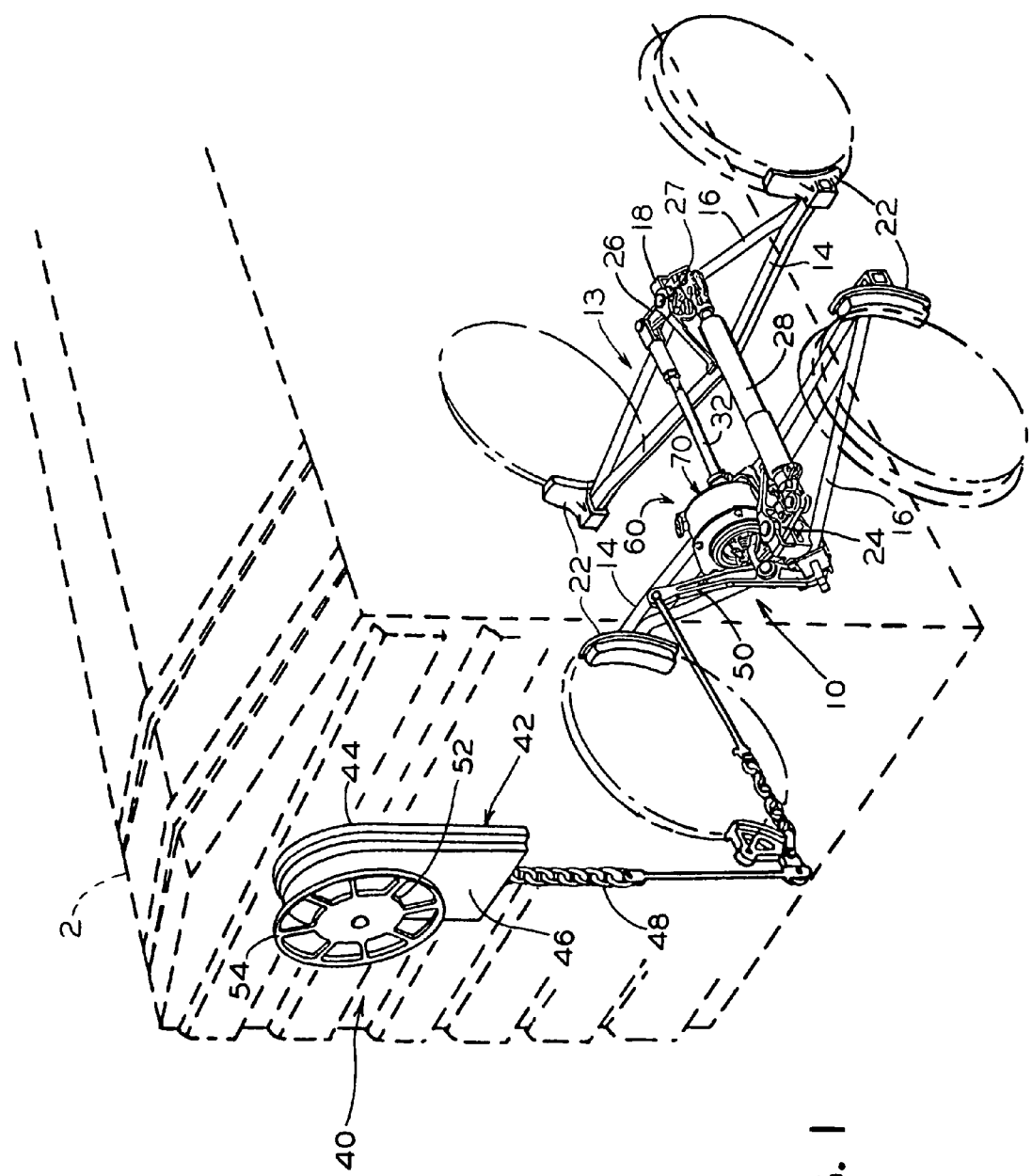
FIG. 1 is an isometric view of a truck-mounted brake rigging including a parking brake assembly of the present invention in combination with a conventional hand brake apparatus installed on a railway car which is partially illustrated.
Figure 2:
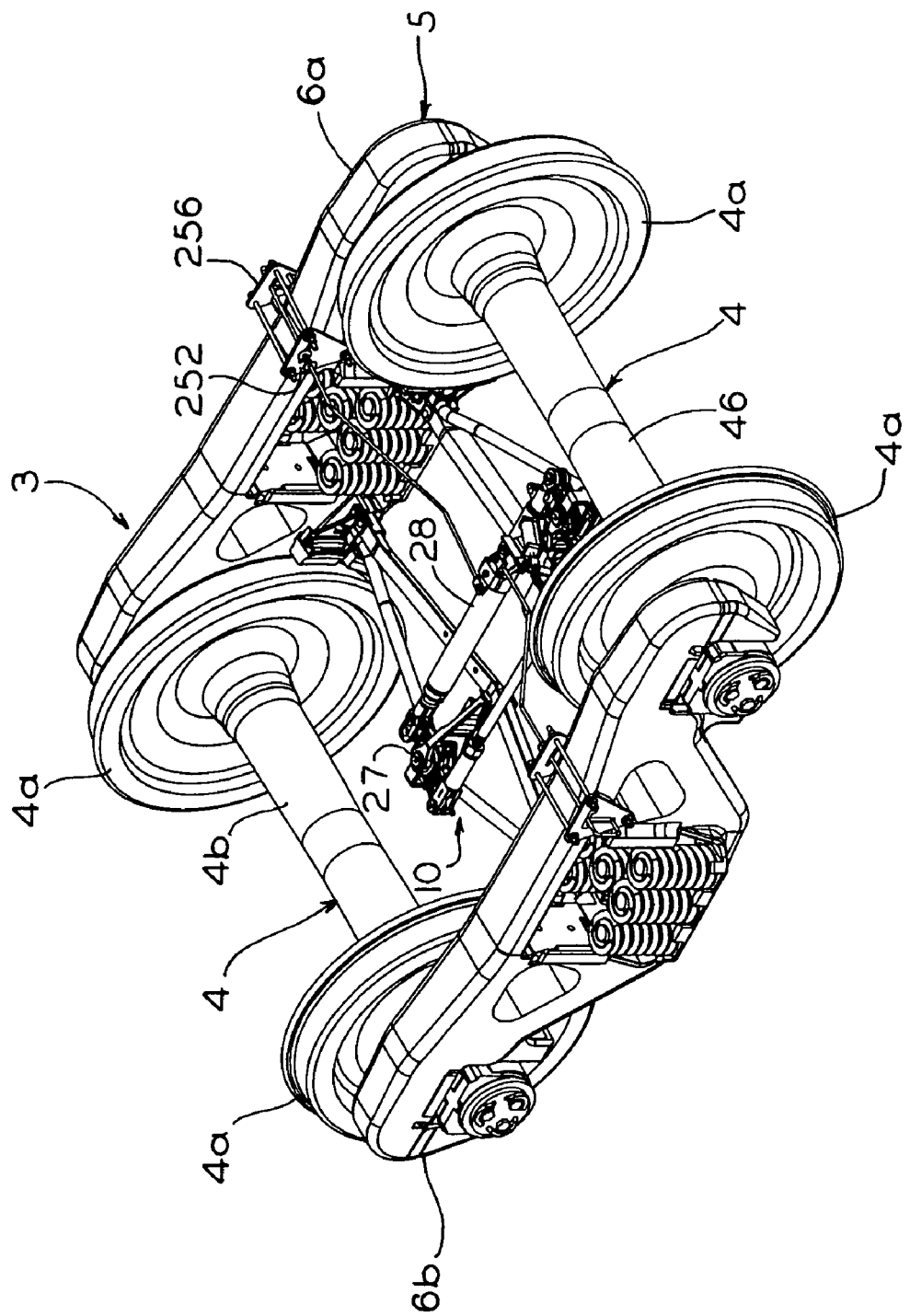
FIG. 2 is an isometric view which shows the parking brake assembly of the present invention installed within the truck apparatus.
Figure 3:
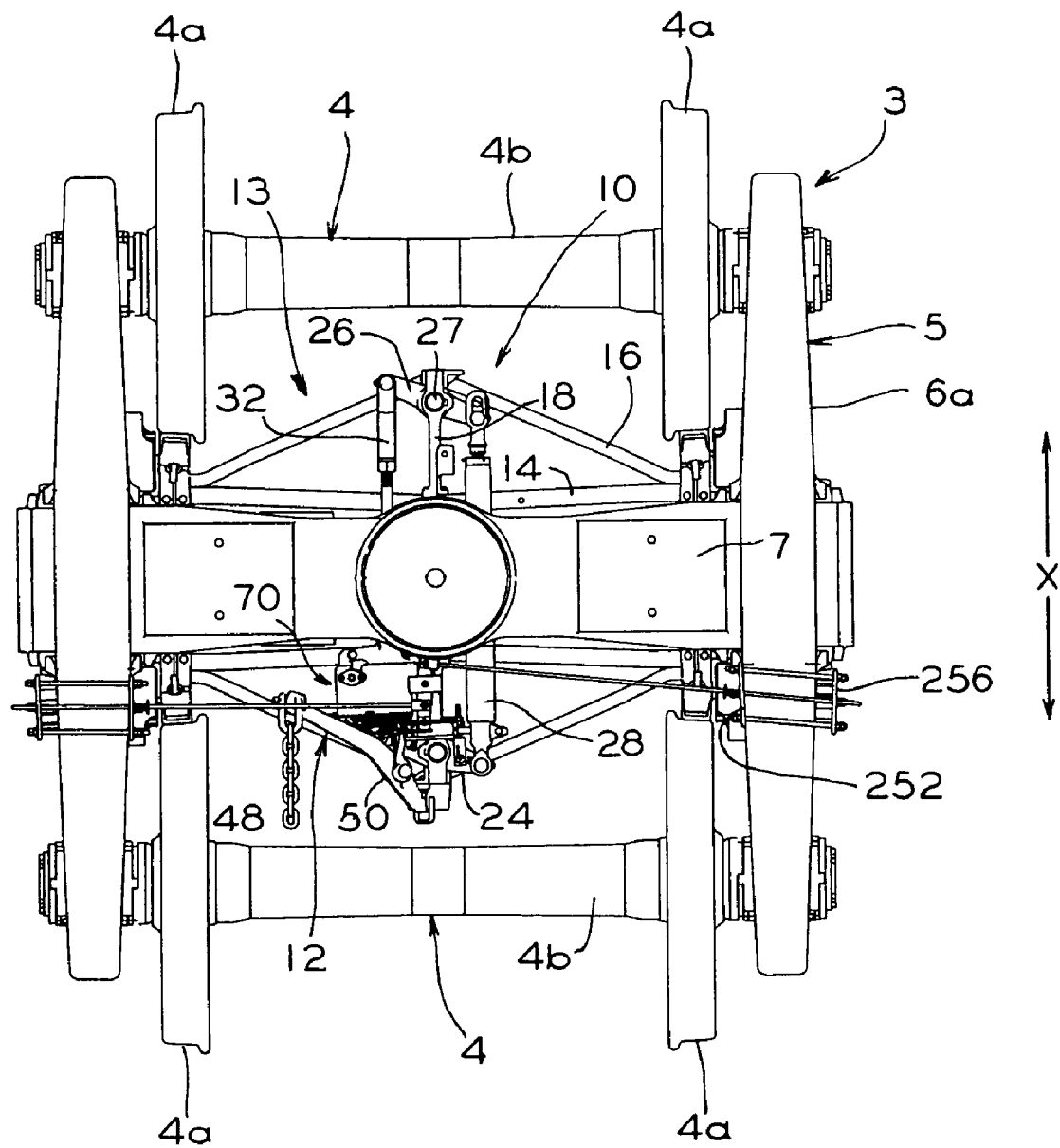
FIG. 3 is a planar view of the parking brake assembly of FIG. 2.
Figure 4:
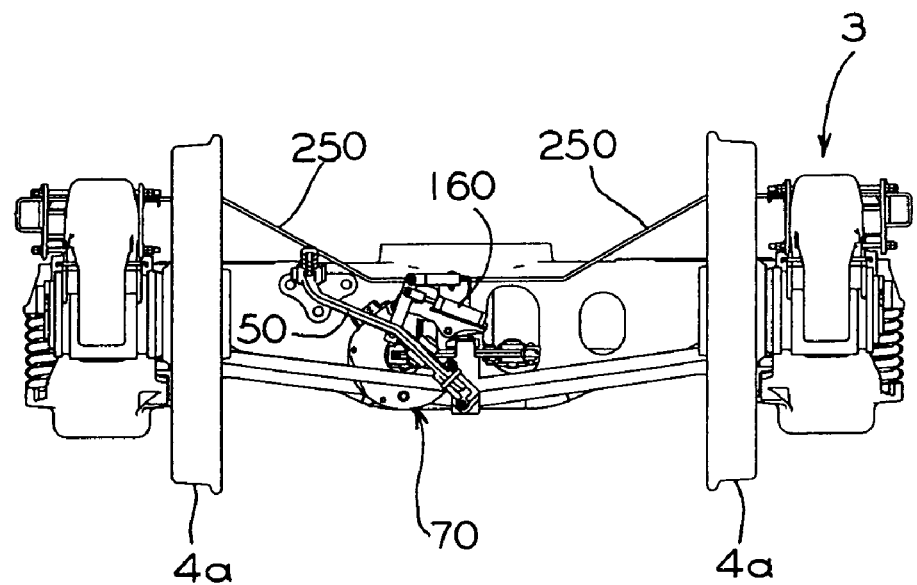
FIG. 4 is a front elevation view of the parking brake assembly of FIG. 2.
Figure 5:
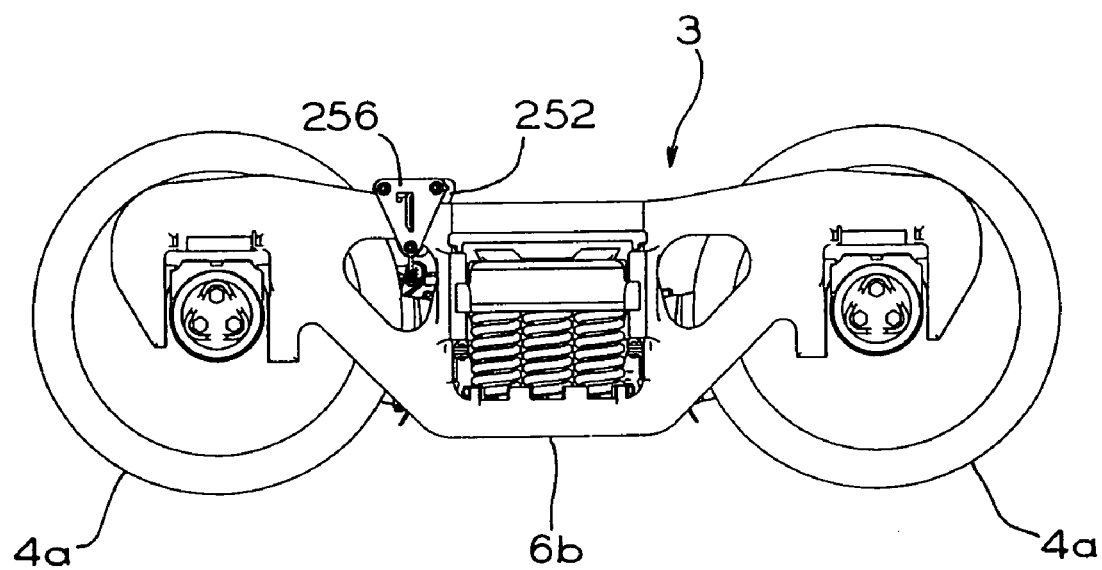
FIG. 5 is a side elevation view of the parking brake assembly of FIG. 2.

Prior to proceeding to the more detailed description of the present invention, it should be noted that, for the sake of clarity and understanding, identical components which have identical functions have been identified with identical reference numerals throughout the several views illustrated in the drawing figures.

The best mode for carrying out the invention is presented in terms of its presently preferred embodiment, herein depicted within FIGS. 1 through 12. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The present invention describes a parking brake assembly for automatically applying brakes of the railway vehicle when the supply of fluid pressure in the brake pipe is essentially lost and for automatically releasing the brakes when the supply of the fluid pressure in the brake pipe is restored. Furthermore, the present invention provides release means for releasing an applied parking brake assembly.

The present invention is illustrated and described in combination with a conventional truck mounted brake rigging employing a conventional pneumatically actuated brake cylinder. However, it will be apparent to those skilled in the relevant art that the present invention may be applied to a car mounted brake rigging as well as to other type of brake actuators and as such should not be interpreted as a limiting factor of the parking brake assembly of the present invention.

Referring now to FIGS. 1-5, there is shown a truck-mounted brake rigging, generally designated 10, for a railway car 2. The brake rigging 10 is installed within a conventional truck apparatus, generally designated as 3, carrying one end of the railway car body. Such truck apparatus 3 includes a pair of wheel sets 4 each having a pair of wheels 4a joined by an axle 4b and a frame 5 supported by the pair of wheel sets 4. The frame 5 includes a pair of side members 6a and 6b joined by a bolster 7.

This brake rigging 10 comprises brake beams, generally designated 12 and 13, which are substantially identical, each such brake beam including a compression member 14, a tension member 16 and a strut member 18. The opposite ends of the compression member 14 and the tension member 16 may be permanently connected together in a conventional manner. Mounted on the respective ends of the brake beams 12 and 13 are brake heads 22.

At a location midway between their opposite ends, the compression member 14 and the tension member 16, of the respective brake beams 12 and 13, are spaced apart sufficiently to allow connection of the strut member 18 therebetween.

A pair of force-transfer levers 24 and 26 are pivotally connected by pins 27 to the strut member 18 of the respective brake beams 12 and 13. One end of the force-transfer levers 24 and 26 is interconnected via the force-transmitting member 28, which may be in the form of an automatic slack adjuster device. The opposite end of the respective force-transfer levers 24 and 26 is connected to the pressure head of the brake actuator, generally designated 70, via a force-transmitting member or a return push rod assembly 32.

Figure 11:
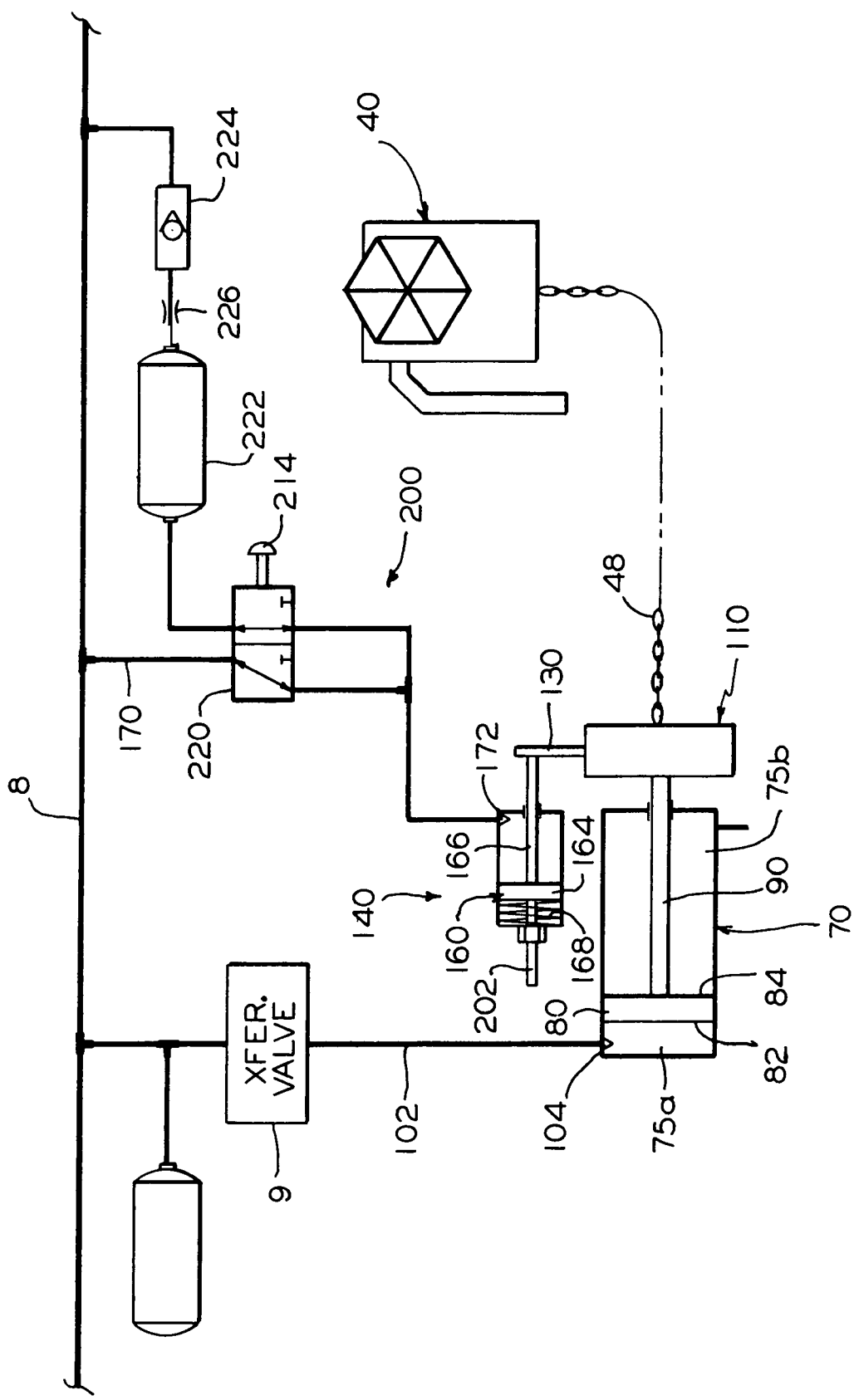
FIG. 11 is a schematic block diagram of the parking brake assembly of the present invention, particularly illustrating a pneumatically operated manual release means constructed according to another embodiment of the invention.
Figure 12:
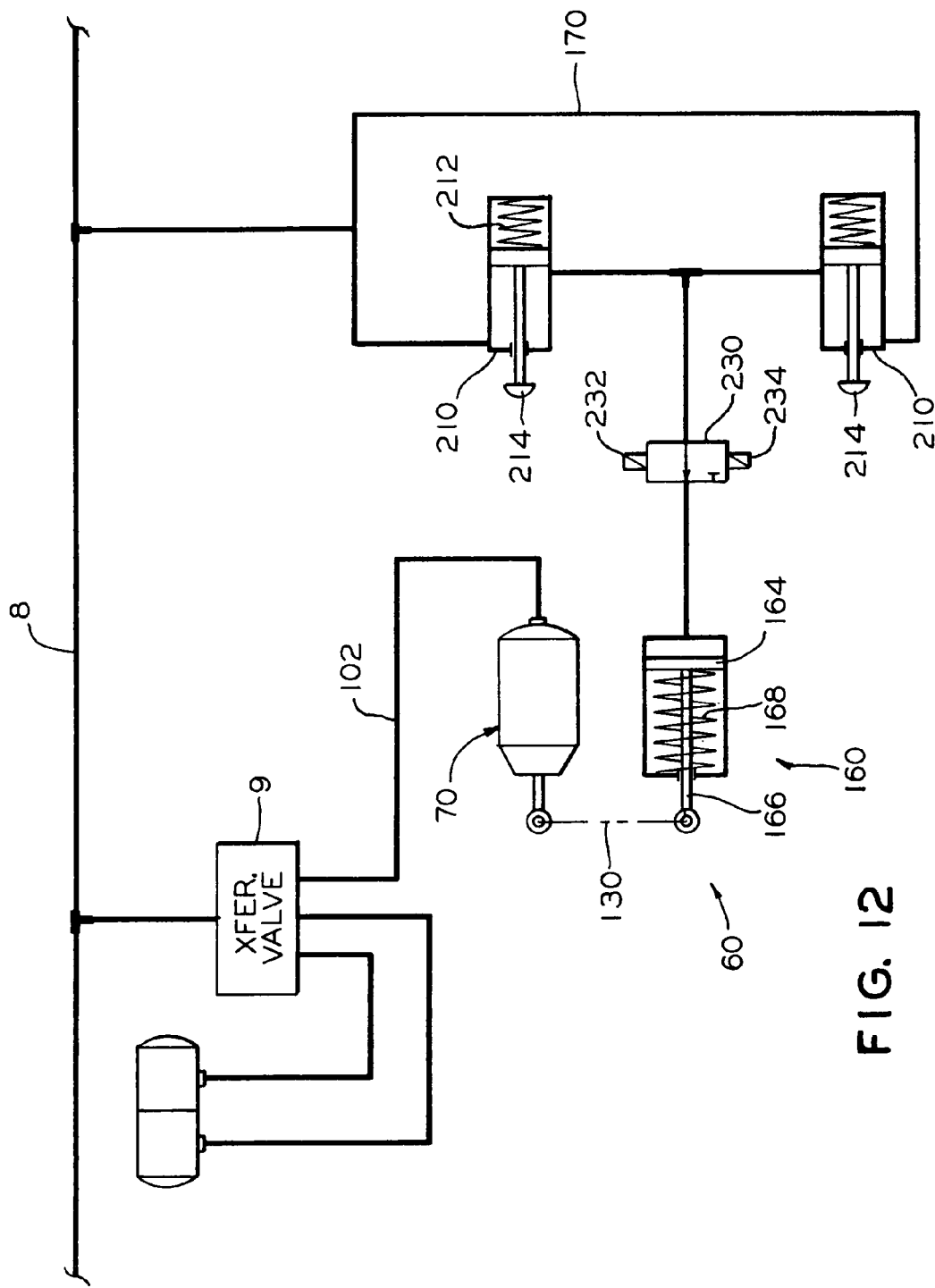
FIG. 12 is a schematic block diagram of the parking brake assembly of the present invention, particularly illustrating a pneumatically operated manual release means constructed according to another embodiment of the invention.

When a brake application is made, reduction of the fluid pressure in the brake pipe 8 causes, through a conventional transfer valve 9 shown in FIGS. 11-12, pressurization of the brake actuator 70 which results in movement of the brake actuator piston mounted within the housing thereof. This movement of the piston causes a spring, also mounted within the housing of the brake cylinder assembly, to compress, resulting in movement of a push rod 30, which is attached to the force transfer lever 24, in a first direction to effect counterclockwise rotation of the force-transfer lever 24. The force-transfer lever 24, in turn actuates the slack adjuster assembly 28 to effect counterclockwise rotation of the force-transfer lever 26 and consequent actuation of the return push rod assembly 32.

The force-transfer levers 24 and 26, along with the slack adjuster assembly 28, the return push rod assembly 32, and the brake actuator 70 comprise a brake beam actuating linkage that interconnects the brake beams 12 and 13 via pivot pins 27 and thus the required brake actuation forces effectively act along these pins 27. The resultant of these forces is shown at X in FIG. 3. Since the length of the slack adjuster assembly 28 increases with actuation of the brake actuator piston rod, it follows that brake beams 12 and 13 are moved apart by the brake beam linkage until the brake shoe engagement with the tread surface of the vehicle wheels 4a occurs. When the fluid pressure is evacuated from the brake actuator 70 due to the reduction of the fluid pressure in the brake pipe 8 and operation of the transfer valve 9, the push rod 30 moves in an opposed second direction causing the brake rigging 10 to release brakes.

During a parking situation when the railway cars 2 are taken out of the railway vehicle and parked at a siding or yard, the pneumatic braking system, as described above, can no longer be used. Thus, in order to apply the brake as a precaution against unwanted or unexpected movement of the cars, a hand brake mechanism, which is mounted on each car, can be employed.

In further reference to FIG. 1, a currently used hand brake mechanism, generally designated as 40, is shown. The hand brake mechanism 40 has a housing, generally designated as 42, which comprises a back plate or wall 44, mountable on a railway car 2, and a cover 46 which is secured to the back wall 44.

A chain 48, for application or release of the brakes, is connected, as is conventional, to the brake rigging 10 via a hand brake lever 50 and wound on a winding drum 52. The hand brake lever 50 is, in turn, connected to the brake actuator transfer lever or force transfer lever 24.

In order to apply the brakes, a hand wheel 54 is rotated in a clockwise direction, as viewed in FIG. 1, to wind the chain 48 about the winding drum 52 and to cause the hand brake lever 50 to be pulled in an outward direction away from the brake rigging 10. This causes the force transfer lever 24 to be rotated in a counterclockwise direction resulting in the push rod 30 being pulled in an outward direction and the required force being applied to the slack adjuster assembly 28. This force is similar to the force which is applied by the brake actuator push rod 30 of the brake actuator 70 when such is pressurized.

However, it has been found that operators may improperly apply the brakes or forget to apply brakes via the hand brake 40 causing unwanted movement of the railway car 2. Furthermore, application and release of the brakes via the hand brake 40 increases operating costs of the railway car 2 due to labor associated with operation of the hand brake 40.

Additionally, unintentional and undesirable ruptures or disconnects within the brake pipe 8 or brake hose (not shown) prevent operation of the brake rigging 10.

Accordingly, the present invention overcomes the disadvantages related to improperly applied hand brake 40 or ruptured or disconnected hose (not shown) by providing a parking brake assembly. The parking brake assembly of the present invention has the added benefit in that it is automatically activated when the railway car 2 has been removed from the train consist and the pneumatic braking system used for activating the above discussed truck mounted brake rigging 10 has been disconnected. Once the railway car 2 has been reconnected with the train and the pneumatic braking system is again in effect, the spring applied parking brake assembly of the present invention is released.

Now in reference to FIGS. 2-12, the parking brake assembly, generally designated as 60, includes the brake actuator 70, which has a housing 72 mounted on the first brake beam 12 adjacent the pivotal connection of the first transfer lever 24. The housing 72 has a first end 73 and an opposed second end 74. The first end 73 is provided with mounting member 73*a* for stationary securing the brake actuator 70 onto the beam 12. As is conventional, the first end 73 of the housing 72 is closed, while the second end 74 is generally open. A fluid-pressure-operable piston assembly 80 is mounted for a longitudinal reciprocal motion within the housing 72. The piston assembly 80 divides the housing 72 into a pressurized portion 75*a* disposed intermediate the first end 73 of the housing 72 and the first end 82 of the piston 80 and a non-pressurized portion 75*b* disposed adjacent the second end 74 thereof. A piston rod 90 is secured at a first end 92 thereof to a second end 84 of the piston assembly 80. The piston rod 90 is capable of extending through the axial opening 76 in the second end 74 of the housing 72 responsive to the supply of fluid pressure into the pressurized portion 75*a*. The piston rod 90 is secured at a second end 94 thereof to a first end of the push rod 30, whereby the piston rod 90 and the piston assembly 80 move with the push rod 30 in the first and second directions.

Thus, in response to the supply of fluid pressure into the pressurized portion 75*a* of the housing 72, the piston assembly 80 moves in the first direction toward the second end 74 of the housing 72 causing the piston rod 90 and the push rod 30 to move in such first direction for increasing the length of the first force-transmitting means, to accordingly increase the spaced-apart distance between the first and second brake beams 12 and 13 respectively in order to apply a braking force.

A spring member 100 is disposed in the non-pressurized portion 75*b* of the housing 72 and is caged between an inner surface 77 of the second end 74 of the housing 72 and the second end 84 of the piston assembly 80. The spring member 100 is capable of exerting a force against the piston assembly 80 upon release of the spring member 100 responsive to evacuation of the fluid pressure from the pressurized portion 75*a* of the housing 72 causing longitudinal movement of the piston assembly 80 in the second direction within the housing 72 to accordingly retract the piston rod 90 thereinto. Accordingly, the push rod 30 will also move in the second direction and release the applied braking force.

A fluid communication means 102, including a convention air pressure inlet 104, is also provided in fluid communication with the pressurized portion 75*a* of the housing 72 and with the brake pipe 8 for supplying the fluid pressure to the parking brake actuator 70 during brake application of the railway vehicle brake rigging 10 resulting in the longitudinal movement of the piston assembly 80 and the piston rod 90 in the first direction and in compression of the spring member 100. The fluid communication means 102 also is provided for evacuating the fluid pressure from the pressurized portion 75*a* of the housing 72 during brake release resulting in the longitudinal movement of the piston assembly 80 and the piston rod 90 in the second direction due to the force exerted by the released spring member 100.

The parking brake assembly 60 further includes a clamping means, generally designated as 110, which is provided for maintaining the extended position of the push rod 30 during reduction of the fluid pressure in the brake pipe 8 to a predetermined level and for releasing the push rod 30 to move in the second direction due to the increase of the fluid pressure in the brake pipe 8 above such predetermined level.

In accordance with a presently preferred embodiment of the invention, such clamping means 110 includes a first elongated thread 112 formed on at least a portion of the exterior surface of the piston rod 90 movable through the non-pressurized portion 75*b* of the housing 72. A ratchet 114 is mounted within the non-pressurized portion 75*b* of the housing 72 for rotation about a longitudinal axis of the piston rod 90. A pair of optional bearings 115 may be provided for facilitating rotation of the ratchet 114. An aperture 116 is axially formed through the ratchet 114. A second thread 118 is formed on a surface of the axial aperture 116 for operable engagement with the first thread 112. There is a shaft 120 which is mounted for rotation in a spaced relationship with the ratchet 114. Rotational axis of the shaft 120 is substantially parallel to a rotational axis of the ratchet 114. The shaft 120 has a first end 122 thereof disposed within the non-pressurized portion 75*b* of the housing 72 and has a second end 124 thereof extending through an aperture 126 formed through the second end 74 of the housing 72 past an outer surface thereof. Finally, a holding pawl 128 is disposed within the non-pressurized portion 75*b* of the housing 72 and is secured to the shaft 120 for rotation therewith. The holding pawl 128 is rotateable in a first rotational direction for engagement with the ratchet teeth when a first rotational force is applied to the second end 124 of the shaft 120 due to the fluid pressure in the brake pipe 8 being reduced to a predetermined level. This engagement prevents movement of the push rod 30 in the second direction. The holding pawl 128 is rotateable in a second rotational direction for disengaging the ratchet teeth and permitting the push rod 30 to move in the second direction when a second rotational force is applied to at least one of the shaft 120 and the holding pawl 128 due to the increase of the fluid pressure in the brake pipe 8.

To mount the clamping means 110, the second end 74 of the housing 72 is formed by the first member 74*a* carrying the outer surface thereon and a second member 74*b* secured in spaced relationship with the first member 74*a* and wherein the ratchet 114 and the holding pawl 128 are mounted intermediate the first and the second members 74*a* and 74*b*. The first and the second members 74*a* and 74*b* are bolted to the flange 72*a* of the housing 72 in a conventional manner.

Figure 6:
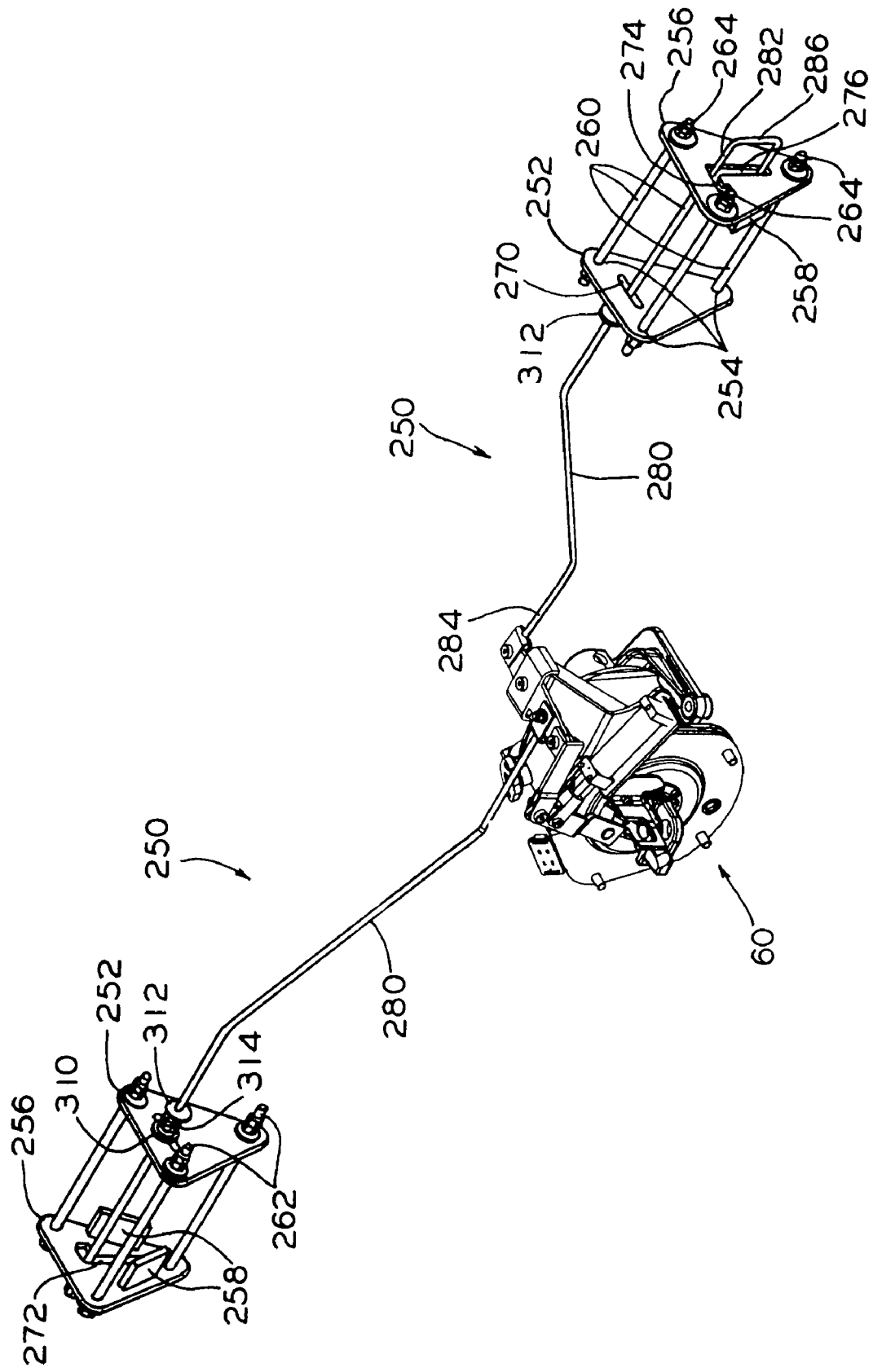
FIG. 6 is an isometric view of the parking brake assembly of the present invention particularly showing the brake actuator and a mechanically operated manual release assembly.
Figure 7:
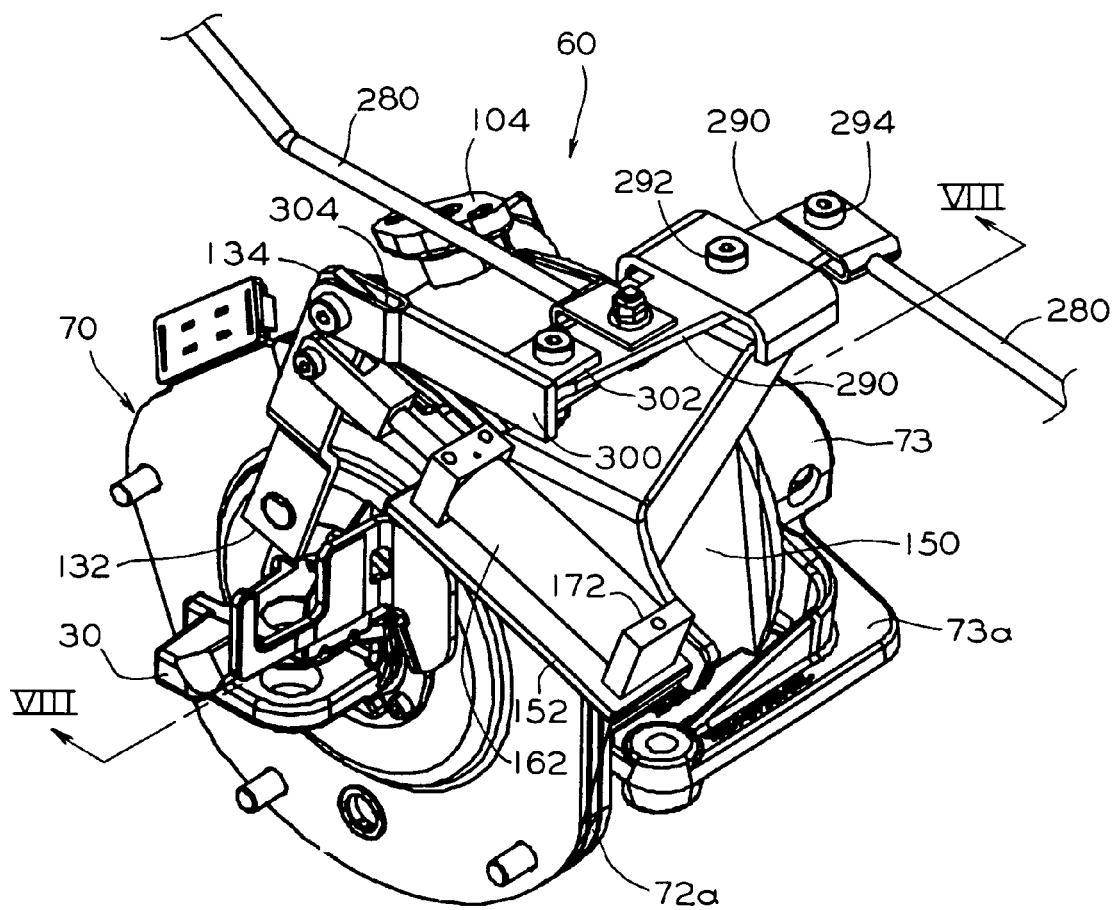
FIG. 7 is an enlarged isometric view of the brake actuator employed within the parking brake assembly of the present invention and which is constructed according to one embodiment of the invention.
Figure 8:
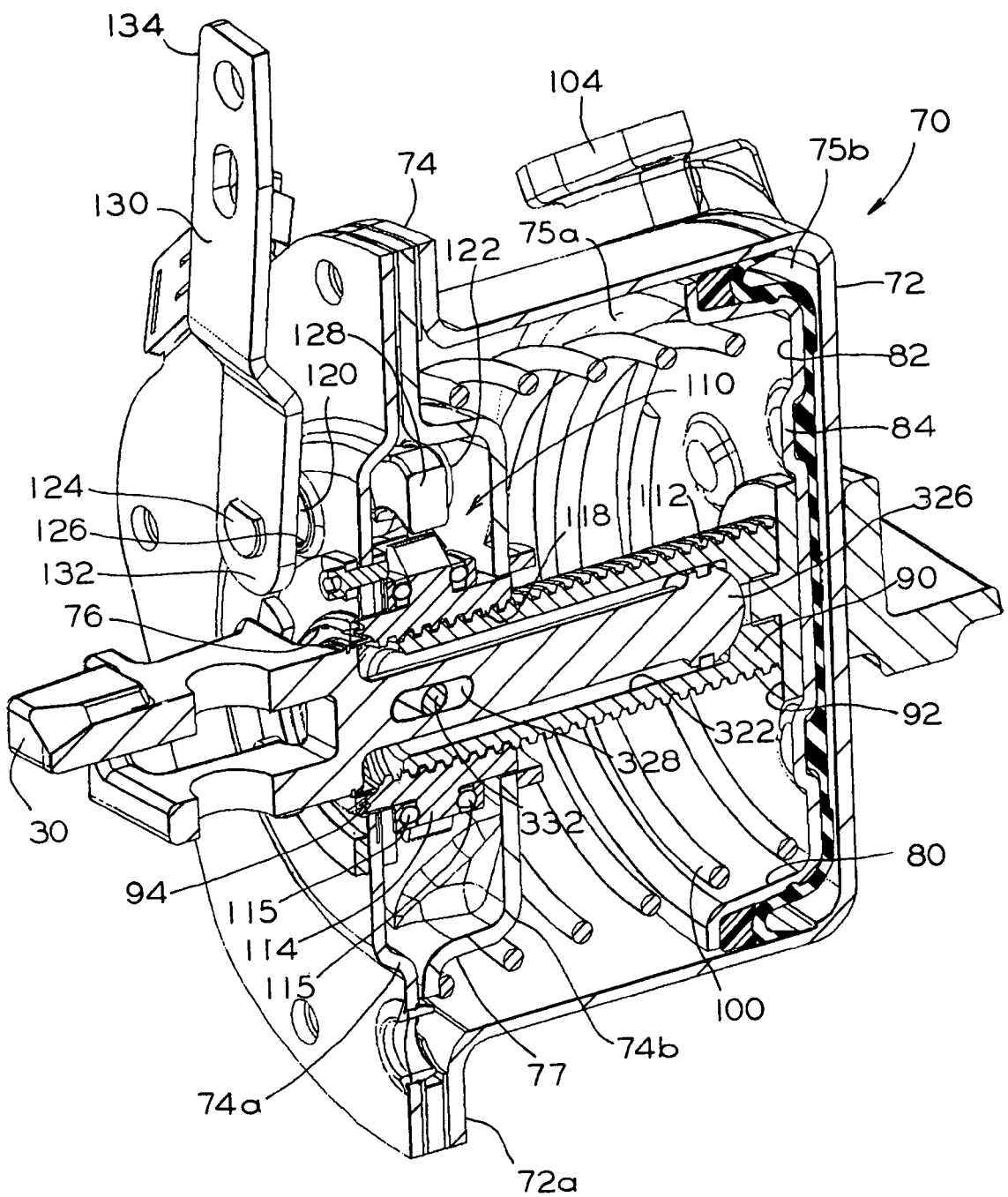
FIG. 8 is a cross-sectional view of the brake actuator along lines VIII-VIII in FIG. 7.
Figure 9:
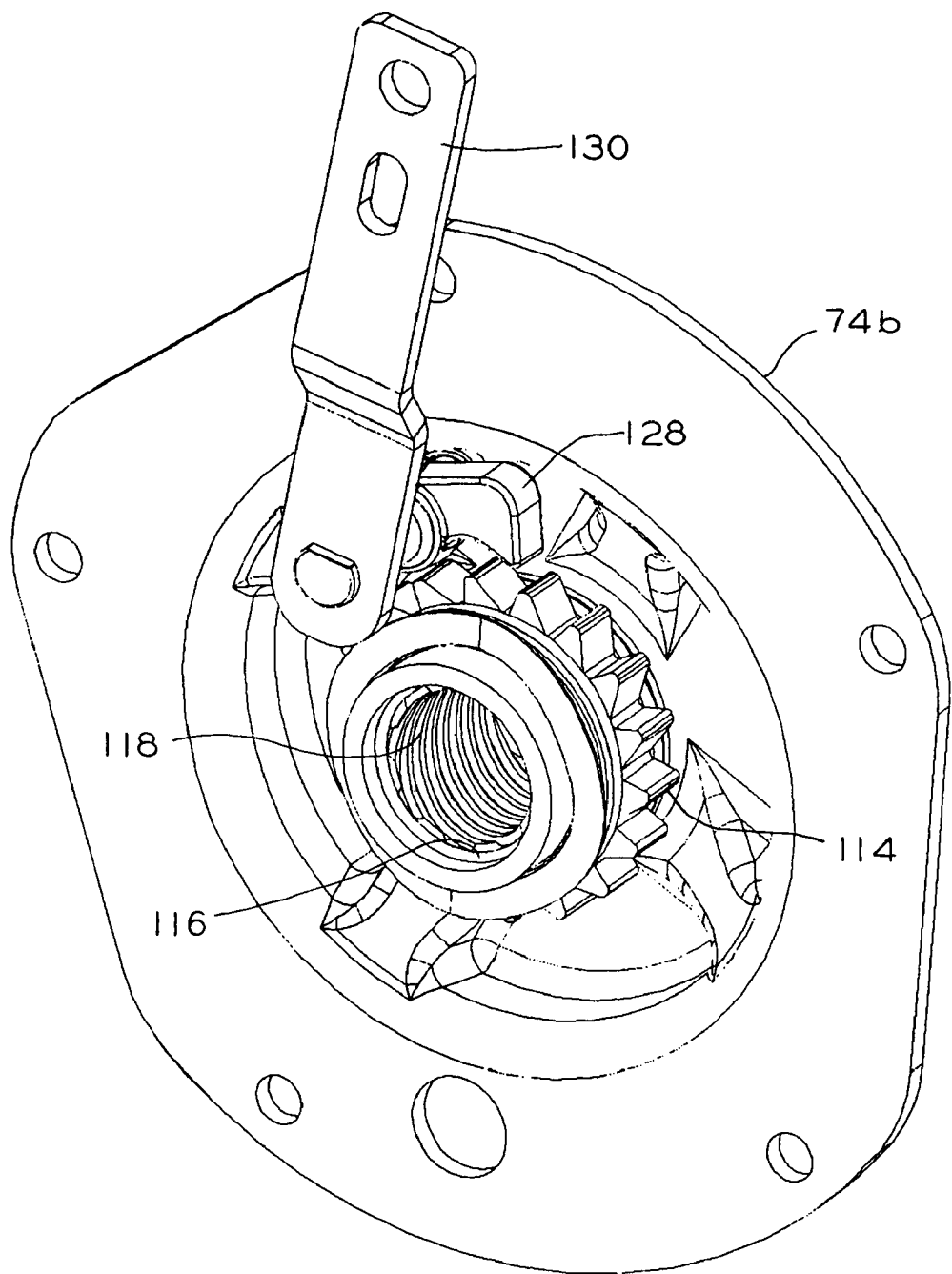
FIG. 9 is a partial isometric view of the brake actuator of FIG. 7, particularly illustrating construction of the ratchet of the present invention.
Figure 10:
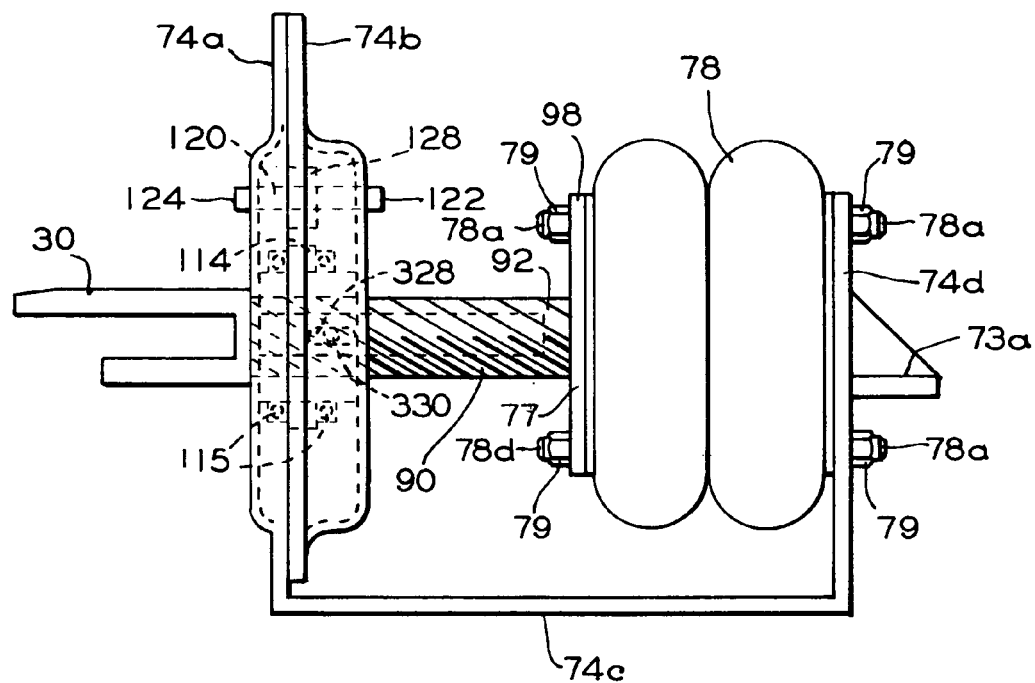
FIG. 10 is an elevation view of the brake actuator employed within the parking brake assembly of the present invention and which is constructed according to another embodiment of the present invention.

Although the parking brake assembly of FIGS. 6-8 has been illustrated by employing a brake actuator 70 having a housing 72 and a piston 80, it is also within the scope of the present invention to employ a brake actuator using an air spring. Such brake actuator is disclosed in a utility patent application Ser. No. 10/645,035 filed on Aug. 21, 2003 and entitled "Universal Brake Assembly. This utility patent application is assigned to the assignee of the present invention and its disclosure is incorporated into this document by reference thereto.

In such prior art brake actuator, the air spring is secured at one end thereof to a front plate-like member incorporating a push rod and is secured at a second end thereof to a mounting bracket for attachment to the brake beam. Accordingly, to employ the air spring 78, the piston rod 90 may be adapted with a flange 77 disposed on and secured to the first end 92 thereof, wherein a first plurality of apertures 98 will be formed therethrough for mounting to the threaded studs 78*a* of the air spring 78 with fasteners 79. To enable operation of the clamping means 110, the second end 74 of the housing 72 will be adapted, for example, with a horizontally disposed flange 74*c* and a vertically disposed flange 74*d* which is also spaced form the member 74*a*. A second plurality of apertures 98 will be formed through the flange 74*d* for mounting to the opposed side of the air spring 78 also having such threaded studs 78*a*. The flange 74*d* will be also adapted with the mounting member 73*a* of the housing 72 for mounting the brake actuator 60 to the brake beam 12. At the same time, the flanges 74*c* and 74*d* will fix the second end 74 in a stationary position relative to the brake beam 13 and enable operation of the ratchet 114 and the holding pawl 128 according to the above described embodiments. Advantageously, the first and second members 74*a* and 74*b* will protect the ratchet 114 and the holding pawl 128 from detrimental elements, such as rocks, debris and the like, present during operation of the railway car 2.

The rotational force may be applied to the second end 124 of the shaft 120 manually, for example with a gripping type tool or a wrench (not shown), and preferably, an operating lever 130 is provided and has a first end 132 thereof disposed on and secured to the second end 124 of the shaft 120 for rotation therewith. Thus, the operating lever 130 is rotateable in the first rotational direction when the first rotational force is applied to a second end 134 thereof and is rotateable in the second rotational direction when the second rotational force is applied to the second end 134 thereof.

It is further presently preferred to provide an operating means, generally designated as 140, which is responsive to a fluid pressure condition within the brake pipe 8 for selectively and automatically operating the clamping means 110 to maintain the push rod 30, after its movement in the first direction, in the position for applying brakes and to release the push rod 30 for movement in the second direction.

Now in further reference to FIGS. 7 and 11, such operating means 140 includes a mounting bracket 150 which is affixed to the outer surface of the second end 74 of the housing 72, preferably using the fasteners that attach the first and second members, 74*a* and 74*b* respectively, to the flange 72*a*. Thus, when installed, the mounting bracket 150 is disposed in a generally vertical plane. The mounting bracket 150 may be provided with a ledge portion 152, which is disposed generally horizontally.

A pneumatically operated cylinder, generally designated as 160, is provided and is mounted on the ledge portion 152 of the mounting bracket 150. The pneumatically operated cylinder 160 has a casing 162, a piston assembly 164 mounted for a longitudinal movement within the casing, a piston rod 166 connected at a first end thereof to a first end of the piston assembly 164 and pivotally connected at a second end thereof to the second end 134 of the operating lever 130, and a spring 168 which is caged within the casing 162 between an end thereof and the second end of the piston assembly 164. When installed within the railway car 2, the piston assembly 164 and piston rod 166 move in a direction which is generally perpendicular to the movement direction of the piston assembly 80, piston rod 90 and push rod 30 as well as to the rotational axis of the ratchet 114 and the holding pawl 128.

A fluid communication means 170, including a conventional fluid port 172, is provided in fluid communication with a second end of the piston assembly 164 and with the brake pipe 8 for supplying the fluid pressure to a second end of the piston assembly 164 causing the piston rod 166 to move outwardly and apply the second rotational force. Furthermore, the second fluid communication means is provided for evacuating the fluid pressure from the second end of the piston assembly 164 when the fluid pressure in the brake pipe 8 is reduced below the predetermined level causing the spring 168 to extend and retract the piston rod 166 into the casing 162, thus applying the first rotational force to the second end 134 of the lever 130.

In normal operation, when the railway car 2 is in motion and/or when the fluid pressure in the brake pipe 8 is at its maximum, generally about ninety (90) pounds per square inch (PSI), the spring member 100 of the parking brake actuator 70 is extended and brakes are released. Consequently, the fluid pressure from the brake pipe 8 is supplied to the pneumatically operated cylinder 160, causing the piston rod 166 to apply a second rotational force to the operating lever 130 thus preventing the holding pawl 128 to engage ratchet 114.

When a partial brake application (ten PSI reduction from maximum in the brake pipe fluid pressure) or a full service brake application (twenty five PSI reduction in the brake pipe fluid pressure from maximum) is commanded from the locomotive (not shown), the fluid pressure is supplied to the pressurized portion 75*a* of the housing 72 causing the piston assembly 80 to move in the first direction toward the second end 74 of the housing 72 and against the resistance of the spring member 100 and, more particularly, causing the piston rod 90 and the push rod 30 to move in such first direction and apply brakes. When a brake release is commanded and the fluid pressure in the brake pipe 8 begins to rise, the fluid pressure is evacuated from the pressurized portion 75*a* of the housing 72 though the directional valve 9 causing the spring member 100 to extend moving the push rod 30 in the second direction and releasing the brake force. As long as the fluid pressure in the brake pipe 8 is above the predetermined level, the piston rod 166 continues to apply the second rotational force to the operating lever 130 thus preventing the holding pawl 128 from engaging ratchet teeth.

When the fluid pressure in the brake pipe 8 reduces below the predetermined level, which is generally set below the level present in full service brake application, the fluid pressure is evacuated from the pneumatically operated cylinder 160, causing the spring 168 to extend and retract the piston rod 166 into the casing 162, thus applying the first rotational force to the second end 134 of the lever 130 and engaging the holding pawl 128 with the ratchet 114. Since the brake actuator 70 will operate as described above to move the push rod 30 in the first direction apply braking force, the engagement of the holding pawl 128 with the ratchet 114 will maintain the push rod 30 in such brake applied condition. Advantageously, the ratchet teeth are formed so that the ratchet 114 rotates to allow movement of the push rod 30 in the first direction even when the holding pawl 128 engages the ratchet 114 prior to the push rod 30 completing its movement to apply brakes. Thus, the present invention is not concerned with timing issues between operation of the brake actuator 70 and operation of the pneumatically operated cylinder 160.

When the supply of the fluid pressure to the cylinder 160 is restored, the piston rod 166 will move outwardly from the housing 162 and apply a second rotational force to the operating lever 130 thus disengaging the holding pawl 128 from engagement with ratchet 114.

The predetermined fluid pressure level in the brake pipe 8 at which the holding pawl 128 engages the ratchet 114 is also dependent on the rate of the spring 168 as well as on specific application requirements. For example, it may be desirable for the holding pawl 128 to engage the ratchet 114 only during a rapid fluid pressure decrease that is commonly known as an emergency brake application when the fluid pressure in the brake pipe reduces to about ten PSI and then further to zero PSI.

It is also within the scope of the present invention to evacuate fluid pressure from and re-supply it to the pneumatically operated cylinder 160 at a different pressure levels within the brake pipe 8. By way of an example only, it may be advantageous to begin disengaging the holding pawl 128 from engagement with the ratchet 114 when the fluid pressure in the brake pipe is increased to about twenty five PSI.

While the above described operation provides for automatic application and release of the brakes, it is within the scope of the present invention to provide a manually operable release means, generally designated as 200, which is coupled to the pneumatically operated cylinder 160 for manually releasing the push rod 30 to move in the second direction.

According to one embodiment of the invention, such manually operable release means 200 includes a release shaft 202 treadably secured to the casing 162 of the pneumatically operated cylinder 160. The release shaft 202 has a first end thereof coaxially secured to the second end of the piston 164 and having a second end thereof extending outwardly from the casing 162, whereby selective manual rotation of the second end of the release shaft 202 causes extension or retraction of the piston rod 166 rotating the operating lever 130 in the first or second rotational directions.

According to another embodiment of the invention, the manually operable release means 200 includes a valve 210, best illustrated in FIG. 12, which is disposed within the fluid communication means 170 intermediate the brake pipe 8 and the pneumatically operated cylinder 160. The valve 210 is operable in a first position for supplying the fluid pressure to the pneumatically operated cylinder 160 when the fluid pressure in the brake pipe 8 is maintained above the predetermined level. In this position, the fluid pressure compresses an extension spring 212 mounted within the valve 210 allowing the fluid pressure to flow through to the pneumatically operated cylinder 160. The valve 210 is also operable in a second position to discontinue, due to release of the compressed spring 212, supply of the fluid pressure to the pneumatically operated cylinder 160 and exhaust the fluid pressure from the pneumatically operated cylinder 160 to atmosphere. When the fluid pressure decreases below the predetermined set level, the spring 212 extends and blocks the flow of the fluid pressure through the valve 210 and opens passage to its exhaust port.

The valve 210 also includes a manually operable means, such as a pushbutton 214 disposed therein, for manually restoring the supply of the fluid pressure to the pneumatically operated cylinder 160. Manual actuation of the pushbutton 214 briefly compresses the spring 212 to allow the flow of the fluid pressure through the valve 210 which will keep the spring 212 in a compressed condition when the pushbutton 214 is released.

A pair of valves 210 may be provided, each installed adjacent a respective end of the railway car 2 to reduce the labor of releasing applied parking brake assembly 60 by eliminating the operator of the railway car 2 to walk to the end having the parking brake assembly 60 installed on.

According to yet another embodiment of the invention, the manually operable release means 200 may include a two-position, three-port valve 220, best shown in FIG. 11. An auxiliary reservoir 222 of the fluid pressure may be connected at one port thereof to the brake pipe 8 through a check valve 224 and a restricting choke 226 mounted in series with the check valve 224 and connected at another port thereof to the valve 220.

It is also within the scope of the present invention to provide other means for operating the valve 210 or 220 to restore of the fluid pressure to the pneumatically operated cylinder 160.

By way of en example only in FIG. 12, a three-way valve 230 may be provided, wherein the pushbutton 214 has been replaced with a solenoid 232 so that the valve 210 can be operable in the second position for allowing flow of the fluid pressure therethrough by an electrical signal which can be remotely transmitted, for example from the locomotive (not shown) by any well known means including wires, radio frequency, satellite communicating and the like methods. This will allow remote release of the applied parking brake assembly 60. Advantageously, the valve 230 may be adapted with a second solenoid 234 to remotely operate such valve 230 into the position for enabling flow of the fluid pressure to the cylinder 160 and, more particularly, allowing remote application of the parking brake assembly 60.

The present invention also contemplates to provide either valve 210, 220 or 230 in combination with the release shaft 202 of FIG. 11. Preferably, a manually operable valve 210 or 220 is mounted in close proximity to the end or the side of the railway car 2 enabling the operator of the railway car 2 to safely and conveniently operate the parking brake assembly 60 from one side of the railway car 2 without the need to reach underneath thereof and into the confines of the truck apparatus 3.

It will be appreciated that the above described manual release means 200 are of a pneumatic type. It is also within the scope of the present invention to provide the manual release means of a solely mechanical type which does not depend on presence or absence of the fluid pressure in the brake pipe 8 to release applied brakes. Such mechanical manual release means, generally designated as 250, will be described below in combination with the brake rigging 10 installed within the truck apparatus 3 carrying one end of the railway vehicle body. As was described above, such truck apparatus 3 includes the frame 5 having the pair of side members 6a and 6b joined by the bolster 7.

Now in further reference to FIGS. 2-7, the manual release means 250 includes a first plate-like member 252 abuttingly engaging an inner vertical surface portion of one side member, shown as 6a, of the truck apparatus 3. A first plurality of apertures 254 are formed through the first plate-like member 252 and are disposed in a predetermined pattern. A second plate-like member 256 abuttingly engages an outer vertical surface portion of the side member 6a. A second plurality of apertures 254 are formed through the second plate-like member 256 and are disposed in the same predetermined pattern as the apertures 254 formed through the first plate-like member 252. Each of the second plurality of apertures 254 is aligned with a respective one of the first plurality of apertures 254. There is a plurality of rods 260 provided with each passed through aligned apertures 254 in the first and second plate-like members, 252 and 256 respectively. A male thread 262 is formed on each end of each rod 260. A plurality of threaded fasteners 264 is used with each fastener 264 operably engaging a respective rod end for affixing the first and second plate-like members, 252 and 256 respectively, about the side member 6a by caging a portion thereof between these plate-like members.

Further, an elongated slot 270 is formed though a first plate-like member 252 and extends in a generally horizontal direction. An L-shaped slot 272 is formed in the second plate-like member 256 and has a horizontal leg 274 thereof aligned with the elongated slot 270 formed through the first plate-like member 252. The L-shaped slot 272 also has a vertical leg 276.

An elongated link member 280 is provided and has a predetermined shape for routing through the truck apparatus 3. The first end 282 of the link member 280 is passed through the elongated slot 270 and through the L-shaped slot 272 and extends outwardly from the second plate-like member 254. There is means provided for connecting a second end 284 of the link member 280 to the parking brake assembly 60. A grip member 286 is disposed on and secured to the first end 282 of the elongated link member 280. This grip member 286 is manually operable to move the link member 280 from a first position enabling application of the parking brake assembly 60 into a second position enabling release of an applied parking brake assembly 60. The grip member 286 may be shaped as a conventional handle and may be further provided integral with the link member 280 by bending the second end 284 thereof. A bias means is provided and is engageable with the elongated link member 280 for returning it into the first position upon release of the grip member 286.

The presently preferred means for connecting the second end 284 of the elongated link member 280 to the parking brake assembly 60 includes first release lever 290 which is pivotally connected to the mounting bracket 150. By way of an example only in FIGS. 6-7, such pivotal connection may be achieved with a pin or fastener 292 passed through aligned apertures (not shown) in the first release lever 290 and the mounting bracket 150. There is also means for pivotally connecting the second end 284 of the elongated link 280 to one end of the first release lever 290. By way of an example only in FIGS. 6-7, such second end 284 may be formed as a bifurcated portion with an aperture (not shown) formed therethrough and aligned with another aperture (not shown) formed through the first release lever 290 and wherein a pin or fastener 294 is passed through these aligned apertures (not shown). There is also a second release lever 300 having a first end 302 thereof pivotally connected to a second end of the first release lever 290 and having a second end 304 thereof pivotally connected to the second end 134 of the operating lever 130.

In operation, manually initiated movement of the elongated link 280 from the first position toward the second position causes rotational movement of the operating lever 130 in the second rotational direction due to rotation of each of the first and second release levers, 290 and 300 respectively, thus enabling the holding pawl 284 to disengage the ratchet teeth and enable the push rod 30 to move in the second direction due to extension of the spring 100 thus releasing the applied braking force. During manual release of the brakes, the grip member 286 is movable through a vertical leg 276 of the L-shaped slot 272 and, accordingly, the manual release mechanism 250 includes a pair of spacers 258 rigidly secured to an inner surface of the second plate-like member 256 for positioning it in a spaced relationship with the outer surface of the side member 6a and for enabling movement of the grip member 286 through the vertical leg 276 of the L-shaped slot 272. The employment of the horizontally disposed leg 274 enables the operator of the railway car 2 to move the grip member 286 through the vertical leg 276 sufficiently to clear the outer surface of the second plate-like member 256 and then move the grip member 286 laterally along the first leg 274 to latch such grip member 286 against the outer surface of the second plate-like member 256 to prevent the elongated link 280 from returning into the first position and, more particularly, prevent the holding pawl 128 from reengaging the ratchet 114. Thus, the railway car 2 can be freely moved. When required, the user laterally moves the grip member 286 in the opposite direction so it can move through the vertical leg 276 thus allowing the link member 280 to return into the first position due to the action of the bias means. It is also within the scope of the present invention to angle the leg 274 downwardly in order to facilitate retention of the grip member 286.

Now in a particular reference to FIG. 7, the bias means may be simply formed by a first washer 310 movably secured to the elongated link member 280, a second washer 312 rigidly secured to the elongated link member 280 in spaced relationship with the first washer 310, and a spring 314 caged between the first washer 310 and the second washer 312. It will be appreciated that the spring 314 will be compressed during movement of the elongated link member 280 into the second position and extend when the manual movement is discontinued and when the link member 280 is unlatched, thus returning it into the first position. The manual release means 250 enables the operator of the railway car 2 to safely and conveniently release the applied parking brake assembly 60 from one side of the railway car 2 without the need to reach underneath thereof and into the confines of the truck apparatus 3.

It is further within the scope of the present invention to provide a second manual release means 250 operable from the other side of the railway car 2 as best shown in FIGS. 2-4 and 7 by mounting it and connecting it in a similar manner.

Figure 13:
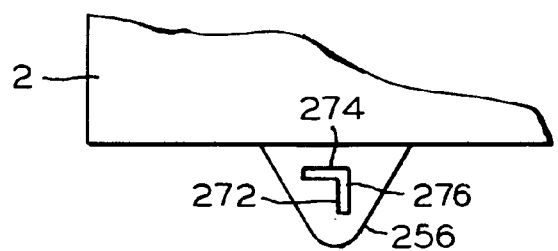
FIG. 13 is an elevation view of a mechanically operated manual release assembly connected to the side of the railway car body, partially illustrated.

Although manual release means 250 has been shown and described in terms of the parking brake assembly 60 being used with a truck mounted brake system, it will be apparent to those skilled in the art that the manual release means 250 may be applied with the parking brake assembly being used with a car body mounted brake system by simply securing the second plate-like member 256 to the side of the railway car body and simply connecting the first end 282 of the elongated member 280 to the second plate-like member 256, as depicted in FIG. 13.

The present invention also contemplates to provide means for compensating for bail of the push rod 30 moving laterally during the rotation of the force-transfer lever 24 and, at the same time, prevent rotation of the piston rod 90 during longitudinal movement. Now in reference to FIGS. 8 and 10, such means includes an axial cavity 322 formed within the piston rod 90 and defining a peripheral wall of the piston rod 90. An aperture is formed through the peripheral wall. An elongated abutment 326 is disposed on and secured to the push rod 30 and is positioned within the axial cavity 322. A slot 328 is formed through the abutment 326 in alignment with the aperture 330 formed through the peripheral wall of the piston rod 90. An elongated pin 332 is frictionally passed through a combination of the slot 328 and the aperture 330 formed through the peripheral wall of the piston rod 90 allowing for axial movement of the push rod 30 while preventing rotational movement of the piston rod 90.

The present invention may provide an ergonomic alternative to the currently used hand wheel activated hand brakes of the prior art, although as it has been shown in various figures, it complements such hand brakes. Additionally, because the parking brake assembly 60 of the present invention automatically activates upon removal of the car from the pneumatic braking system of the railway vehicle, the possibility of unwanted movement of a parked railway car 2 has been at least substantially reduced.

The present invention also provides a novel alternative to a commonly used brake actuators of a spring-applied, air-released type wherein the braking force to the wheels 4*a* is applied due to loss of the fluid pressure in the brake pipe 8. The present invention applies the braking force (or applies brakes) in a conventional manner when the fluid pressure in the brake pipe 8 is partially reduced and maintains the applied braking force and, consequently, the applied brakes when the fluid pressure in the brake pipe reduces to zero PSI.

Although the present invention has been shown in terms of the parking brake assembly 60 being used with a truck mounted brake rigging 10, it will be apparent to those skilled in the art, that the present invention may be applied to a car mounted brake system.

Such car mounted brake system may be of a type as disclosed for example in FIG. 1 of U.S. Pat. No. 6,854,570 issued to Connel and whose teachings are incorporated into this document by reference thereto. Accordingly, the brake actuator 12 of FIG. 1 of U.S. Pat. No. 6,854,570 will be replaced with a brake actuator constructed according to the construction of the brake actuator 70 with further accommodations for operating a pair of truck mounted brake riggings from a single brake actuator.

It will be further apparent to those skilled in the art, that at least the cylinder 160 may be replaced with a linear electrical drive, such as a linear motor, solenoid or a screw drive, which can be locally or remotely operated to at least release the applied parking brake assembly which can be also of an electrically actuated type.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

We claim:

1. A parking brake actuator for a railway vehicle brake rigging being in fluid communication with a fluid pressure carrying brake pipe of the railway vehicle, the brake rigging having at least a push rod mounted for movement therewithin, the push rod is responsive to a reduction of the fluid pressure in the brake pipe to move in a first direction causing the brake rigging to apply brakes and responsive to an increase of the fluid pressure in the brake pipe to move in an opposed second direction causing the brake rigging to release brakes, said parking brake actuator comprising:
   (a) a hollow housing engageable with a predetermined portion of the brake rigging, said housing having a first end and an opposed second end, said first end having means for mounting said parking brake actuator to a portion of the brake rigging, said second end having an opening axially formed therethrough;
   (b) a piston assembly mounted for a longitudinal movement within said housing and dividing said housing into a pressurized portion disposed intermediate said first end of said housing and a first end of said piston assembly and a non-pressurized portion disposed adjacent said second end of said housing;
   (c) a piston rod secured at a first end thereof to a second end of said piston assembly and capable of extending through said axial opening in said second end of said housing responsive to the supply of fluid pressure, said piston rod securable at a second end thereof to a first end of the push rod, whereby said piston rod and said piston assembly move longitudinally with the push rod in the first and second directions;
   (d) means for preventing rotation of said piston rod during its longitudinal movement within said housing;
   (e) a spring member disposed in said non-pressurized portion of said housing and caged between an inner surface of said second end of said housing and said second end of said piston assembly, said spring member being capable of exerting a force against said piston assembly upon release of said spring member responsive to a loss of the fluid pressure in said pressurized portion of said housing and causing said longitudinal movement of said piston assembly within said housing in the second direction to accordingly retract said piston rod thereinto;
   (f) a fluid communication means in fluid communication with said pressurized portion of said housing and with the brake pipe for supplying the fluid pressure to said parking brake actuator during brake application of the railway vehicle brake rigging resulting in said longitudinal movement of said piston assembly and said piston rod in the first direction and in compression of said spring member, said fluid communication means for evacuating the fluid pressure from said pressurized portion of said housing during brake release resulting in said longitudinal movement of said piston assembly and said piston rod in the second direction due to said force exerted by said released spring member;
   (g) a first elongated thread formed on at least a portion of said piston rod movable through said non-pressurized portion of said housing;
   (h) a ratchet mounted within said non-pressurized portion of said housing for rotation about a longitudinal axis of said piston rod;
   (i) an aperture axially formed through said ratchet;
   (j) a second thread formed on a surface of said axial aperture for operable engagement with said first thread;
   (k) a shaft mounted for rotation in a spaced relationship with said ratchet, wherein a rotational axis of said shaft is substantially parallel to a rotational axis of said ratchet, said shaft having a first end thereof disposed within said non-pressurized portion of said housing and having a second end thereof extending through an aperture formed through said second end of said housing past an outer surface thereof; and
   (l) a holding pawl disposed within said non-pressurized portion of said housing and secured to said shaft for rotation therewith, said holding pawl rotateable in a first rotational direction for engagement with said ratchet teeth when a first rotational force is applied to said second end of said shaft due to the fluid pressure in the brake pipe being reduced to a predetermined level, said engagement preventing movement of the push rod in the second direction, said holding pawl rotateable in a second rotational direction for disengaging said ratchet teeth and permitting the push rod to move in the second direction when a second rotational force is applied to at least one of said second end of said shaft and said holding pawl due to the increase of the fluid pressure in the brake pipe.

2. The parking brake actuator, according to claim 1, wherein said parking brake actuator includes an operating lever having a first end thereof disposed on and secured to said second end of said shaft for rotation therewith, said operating lever rotateable in said first rotational direction when said first rotational force is applied to a second end thereof and rotateable in said second rotational direction when said second rotational force is applied to said second end thereof.

3. The parking brake actuator, according to claim 1, wherein said second end of said housing is formed by a first member carrying said outer surface thereon and a second member carrying thereon said inner surface of said second end of said housing, said second member secured in spaced relationship with said first member and wherein said ratchet and said holding pawl are mounted intermediate said first and said second members.

4. The parking brake actuator, according to claim 1, wherein said parking brake actuator includes:
   (a) a mounting bracket affixed to said outer surface of said second end of said housing;
   (b) a pneumatically operated cylinder mounted on said bracket and having a casing, a second piston assembly mounted for a longitudinal movement within said casing, a second piston rod connected at a first end thereof to a first end of said second piston assembly and connected at a second end thereof to said second end of said operating lever, and a second spring caged within said casing between an end thereof and said first end of said second piston assembly; and
   (c) a second fluid communication means in fluid communication with a second end of said second piston assembly and with the brake pipe for supplying the fluid pressure to a second end of said second piston assembly causing said second piston rod to move outwardly and apply said second rotational force, said second fluid communication means further for evacuating the fluid pressure from said second end of said second piston assembly when the fluid pressure in the brake pipe is reduced below said predetermined level causing said second spring to retract said second piston rod into said casing and apply said first rotational force to said second end of said lever.

5. The parking brake actuator, according to claim 4, wherein said parking brake actuator further includes a manually operable release means coupled to said pneumatically operated cylinder for manually releasing the push rod to move in the second direction.

6. The parking brake actuator, according to claim 5, wherein said manual release means includes a release shaft treadably secured to said casing of said pneumatically operated cylinder, said release shaft having a first end thereof coaxially secured to a second end of said second piston assembly and having a second end thereof extending outwardly from said casing, whereby selective manual rotation of said second end of said release shaft causes selective extension and retraction of said second piston rod respectively rotating said operating lever in said second and first rotational directions.

7. The parking brake actuator, according to claim 5, wherein said manual release means includes a valve disposed within said second fluid communication means, said valve is operable in a first position for supplying the fluid pressure to said pneumatically operated cylinder when the fluid pressure in the brake pipe is maintained above said predetermined level and operable in a second position to discontinue supply of the fluid pressure to said pneumatically operated cylinder when the fluid pressure in the brake pipe falls below said predetermined level.

8. The parking brake actuator, according to claim 7, wherein said valve includes means operably connected thereto for restoring previously discontinued supply of the fluid pressure to said pneumatically operated cylinder.

9. The parking brake actuator, according to claim 8, wherein said fluid pressure supply restoration means includes a manually operable pushbutton.

10. The parking brake actuator, according to claim 8, wherein said fluid pressure supply restoration means includes an electrically operated solenoid operably connected to a source of electrical signal.

11. The parking brake actuator, according to claim 1, wherein said piston rod rotation preventing means includes:
   (a) an axial cavity formed within said piston rod and defining a peripheral wall of said piston rod;
   (b) an aperture formed through said peripheral wall;
   (c) an abutment disposed on and secured to the push rod, said abutment positioned within said axial cavity of said piston rod;
   (d) a slot formed through said abutment in alignment with said aperture formed through said peripheral wall of said piston rod; and
   (e) an elongated pin frictionally passed through a combination of said aperture formed through said peripheral wall of said piston rod and said slot.

12. A parking brake assembly for a brake rigging in a railway vehicle, such brake rigging at least including a push rod mounted for reciprocal motion within the brake rigging and a pneumatic fluid-pressure-operable brake actuator connected to a the push rod and responsive to supply of pneumatic fluid pressure to longitudinally move the push rod in a first direction in order to apply a braking force, the brake actuator responsive to a loss of the pneumatic fluid pressure supply to longitudinally move the push rod in a second direction to release the braking force, said parking brake assembly comprising:
   (a) a first elongated thread formed concentrically with a longitudinal axis of the push rod;
   (b) a ratchet mounted for rotation about said longitudinal axis of the push rod;
   (c) an aperture axially formed through said ratchet;
   (d) a second thread formed on a surface of said axial aperture for operable engagement with said first thread;
   (e) a shaft mounted for rotation in a spaced relationship with said ratchet, wherein a rotational axis of said shaft is substantially parallel to a rotational axis of said ratchet;
   (f) a holding pawl disposed on and secured to said shaft for rotation therewith, said holding pawl rotateable in a first rotational direction for engagement with said ratchet teeth when a first rotational force is applied to said shaft due to the fluid pressure in the brake pipe being reduced to a predetermined level, said engagement preventing movement of the push rod in the second direction, said holding pawl rotateable in a second rotational direction for disengaging said ratchet teeth and permitting the push rod to move in the second direction when a second rotational force is applied to at least one of said shaft and said holding pawl due to the increase of the fluid pressure in the brake pipe;
   (g) an operating lever having a first end thereof disposed on and secured to an end of said shaft for rotation therewith in said first and second rotational direction and having a second end for receiving each of said first and said second rotational force;
   (h) a mounting bracket affixed to at least one of the pneumatic fluid-pressure-operable brake actuator, the first second spaced-apart beam and the second spaced-apart beam;
   (i) a pneumatically operated cylinder mounted on said bracket and having a casing, a piston assembly mounted for a longitudinal movement within said casing, a piston rod connected at a first end thereof to a first end of said piston assembly and connected at a second end thereof to said second end of said operating lever, and a spring caged within said casing between an end thereof and said first end of said piston assembly; and (j) a fluid communication means in fluid communication with a second end of said piston assembly and with the brake pipe for supplying the fluid pressure to said second end of said piston assembly causing said piston rod to move outwardly and apply said second rotational force to said second end of said operating lever and for evacuating the fluid pressure from said second end of said piston assembly when the fluid pressure in the brake pipe is reduced below said first predetermined level causing said spring to retract said piston rod into said casing and apply said first rotational force to said second end of said operating lever.

13. The parking brake assembly, according to claim 12, wherein the brake rigging is installed within a truck apparatus carrying one end of a railway vehicle body, such truck apparatus including a pair of wheel sets each having a pair of wheels joined by an axle and a frame supported by the pair of wheel sets and wherein said parking brake assembly includes a release means manually operable external to a side member of the truck apparatus for releasing an applied parking brake assembly.

14. The parking brake assembly, according to claim 13, wherein said manual release means includes:
    (a) a first plate-like member abuttingly engaging an inner vertical surface portion of the side member of the truck apparatus;
    (b) a first plurality of apertures formed through said first plate-like member and disposed in a predetermined pattern;
    (c) a second plate-like member abuttingly engaging an outer vertical surface portion of the side member;
    (d) a second plurality of apertures formed through said second plate-like member and disposed in said predetermined pattern, each of said second plurality of apertures is aligned with a respective one of said first plurality of apertures;
    (e) a plurality of rods each passed through respectively aligned apertures in said first and second plate-like members;
    (f) a male thread formed on each end of said each rod;
    (g) a plurality of threaded fasteners each operably engaging a respective rod end for affixing said first and second plate-like members to the side member;
    (h) an elongated slot formed though a first plate-like member and extending in a generally horizontal direction;
    (i) an L-shaped slot formed in said second plate-like member and having a horizontal leg thereof aligned with said elongated slot formed through said first plate-like member;
    (j) an elongated link member routed through the truck apparatus, said link member having a first end thereof passed through said elongated slot and through said L-shaped slot and extending outwardly from said second plate-like member;
    (k) means for connecting a second end of said link member to said parking brake assembly;
    (l) a grip member disposed on and secured to said first end of said elongated link member, said grip member manually operable to move said link member from a first position enabling application of said parking brake assembly into a second position enabling release of an applied parking brake assembly; and
    (m) a bias means engageable with said elongated link member for returning it into said first position upon release of said grip member.

15. The parking brake assembly, according to claim 14, wherein said means for connecting said second end of said elongated link member to said parking brake assembly includes:
    (a) first release lever pivotally connected to said mounting bracket;
    (b) means for pivotally connecting said second end of said elongated link to one end of said first release lever;
    (c) a second release lever having a first end thereof pivotally connected to a second end of said first release lever and having a second end thereof pivotally connected to said second end of said operating lever, whereby manually operable movement of said elongated link from said first position causes rotational movement of said operating lever in said second rotational direction due to rotation of each of said first and second release levers thus enabling said holding pawl to disengage said ratchet teeth and enable the push rod to release the braking force.

16. The parking brake assembly, according to claim 14, wherein said parking brake assembly further includes a second manual release means manually operable external to an opposed side member of the truck apparatus for releasing an applied parking brake assembly.

17. The parking brake assembly, according to claim 14, wherein said bias means includes a first washer disposed on said elongated link member in spaced relationship from said second end thereof, a second washer secured to said elongated link member in spaced relationship with said first washer, and a spring caged between said first washer and said second washer.

18. The parking brake assembly, according to claim 14, wherein said grip member is movable through a vertical leg of said L-shaped slot and wherein said manual release mechanism includes a pair of spacers rigidly secured to an inner surface of said second plate-like member for positioning it in a spaced relationship with the outer surface of the side member of the truck apparatus and for enabling movement of said grip member through said vertical leg of said L-shaped slot.

* * * * *